United States Patent [19]

Blacket et al.

[11] Patent Number: 6,089,437
[45] Date of Patent: Jul. 18, 2000

[54] FEEDING HEAD FOR A FASTENER MACHINE

[75] Inventors: Stuart Edmund Blacket, Alderley; Ralph Fuhrmeister, Runcorn, both of Australia

[73] Assignee: Henrob Ltd., Clywd, United Kingdom

[21] Appl. No.: 09/004,426

[22] Filed: Jan. 8, 1998

Related U.S. Application Data

[63] Continuation of application No. 08/240,768, filed as application No. PCT/AU92/00621, Nov. 20, 1992, abandoned.

[30] Foreign Application Priority Data

| Nov. 20, 1991 | [AU] | Australia | ................................. PK9602 |
| Feb. 13, 1992 | [AU] | Australia | ................................. PL0879 |
| Jun. 22, 1992 | [AU] | Australia | ................................. PL3092 |

[51] Int. Cl.[7] .......................................................... B25C 1/04
[52] U.S. Cl. ............................................. 227/136; 227/139
[58] Field of Search .............................. 29/798, 716, 707, 29/34 B; 72/18.6, 391.6; 83/135, 137; 227/136, 51, 135, 139

[56] References Cited

U.S. PATENT DOCUMENTS

| 3,112,562 | 12/1963 | Wilson | ........................................ 29/430 |
| 3,747,193 | 7/1973 | Gregory | ................................. 227/51 X |
| 3,826,419 | 7/1974 | Maestri | .................................... 227/136 |
| 3,929,269 | 12/1975 | Hodil | ................................... 227/136 X |
| 3,938,657 | 2/1976 | David | ....................................... 206/343 |
| 3,946,479 | 3/1976 | Goodsmith et al. | ....................... 29/798 |
| 3,967,727 | 7/1976 | Jakesch | ..................................... 206/344 |
| 4,251,017 | 2/1981 | Doyle et al. | ........................ 227/136 X |
| 4,270,687 | 6/1981 | Maurer | ..................................... 227/113 |
| 4,410,103 | 10/1983 | Fuhrmeister | ......................... 227/107 X |
| 4,449,283 | 5/1984 | Berecz et al. | ........................ 227/136 X |
| 4,606,487 | 8/1986 | Douri | .......................................... 227/8 |
| 4,615,475 | 10/1986 | Fuhrmeister | ............................ 227/136 |
| 4,619,393 | 10/1986 | Maurer | .................................... 227/136 |
| 4,784,308 | 11/1988 | Novak et al. | ........................... 227/130 |
| 4,795,074 | 1/1989 | Frzncis | ..................................... 227/136 |
| 4,893,394 | 1/1990 | Muller | .................................... 72/391.2 |
| 4,932,580 | 6/1990 | Pfister et al. | ........................ 227/136 X |
| 5,072,518 | 12/1991 | Scott | ......................................... 29/798 |
| 5,172,467 | 12/1992 | Muller | ................................... 29/798 X |

FOREIGN PATENT DOCUMENTS

| 48649/59 | 11/1960 | Australia . |
| 31243/71 | 1/1973 | Australia . |
| 31244/71 | 1/1973 | Australia . |
| 31437/71 | 1/1973 | Australia . |
| 79589/75 | 9/1976 | Australia . |
| 38413/78 | 1/1980 | Australia . |
| 68118/81 | 9/1981 | Australia . |
| 28506/84 | 11/1984 | Australia . |
| 0 182 504 | 5/1986 | European Pat. Off. . |
| 1 486 312 | 4/1969 | Germany . |
| 1728463 | 2/1973 | Germany . |
| 25 27 140 | 3/1976 | Germany . |
| 384 765 | 1/1988 | Germany . |
| 463245 | 11/1968 | Switzerland . |
| 2 046 654 | 11/1980 | United Kingdom . |

*Primary Examiner*—Rinaldi I. Rada
*Assistant Examiner*—Boyer Ashley
*Attorney, Agent, or Firm*—Foley & Lardner

[57] ABSTRACT

A fastening machine (e.g. for rivets) has a fastening head where the fasteners are brought into alignment with the punch and die in a carrier tape. The carrier tape has a web with slits or teeth engageable by a sprocket wheel which sequentially advances the fasteners until the stems engage a retractable stop. When the punch is advanced, the fasteners are pushed through the carrier tape to be deformed by an upsetting die aligned with the punch. In modified embodiments, the fasteners are urged transversely from the web of the carrier tape, the carrier tape being advanced by a gear which engages teeth on a side flange on the carrier tape. The sprocket wheel may be remotely driven e.g. by a flexible cable drive to accommodate the movement as the fastening head is advanced towards, or retracted from, the upsetting die.

9 Claims, 14 Drawing Sheets

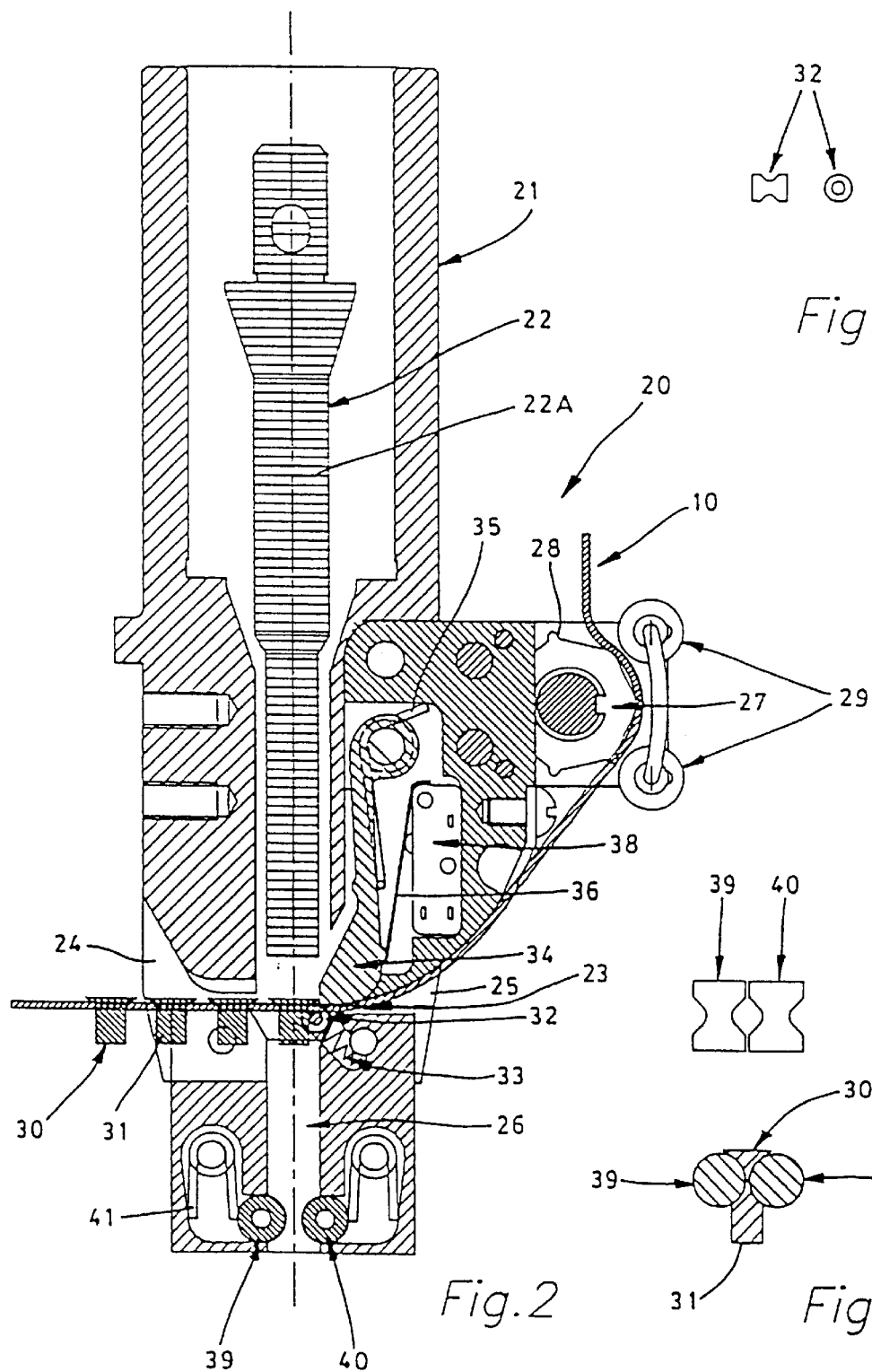

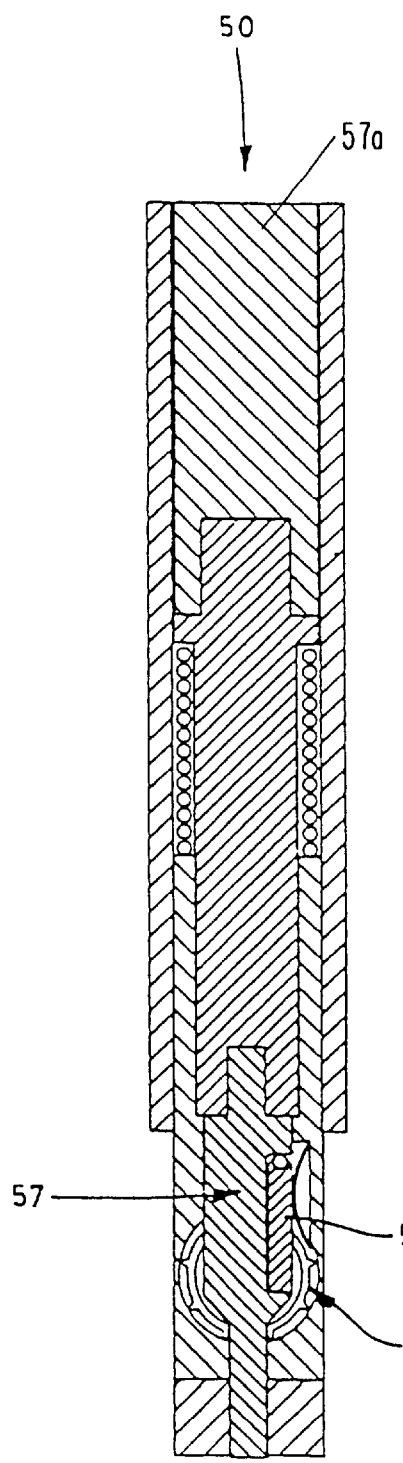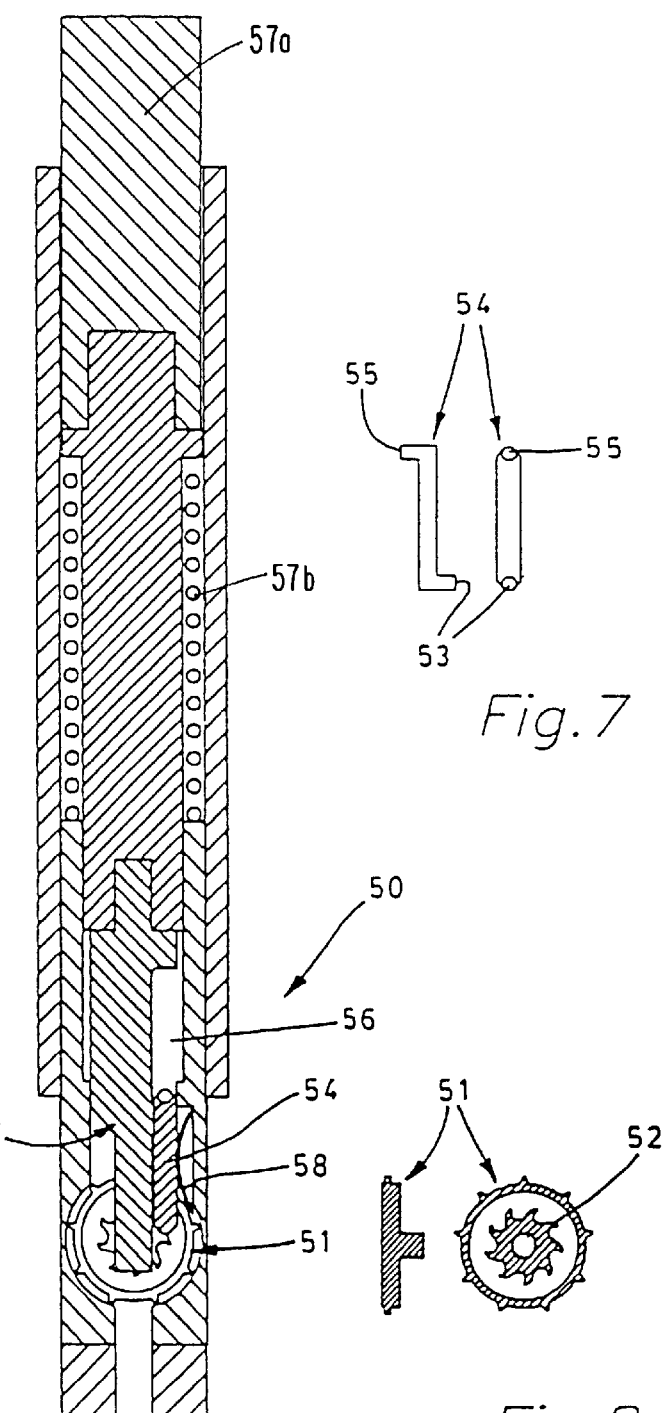
Fig. 5  Fig. 6  Fig. 7  Fig. 8

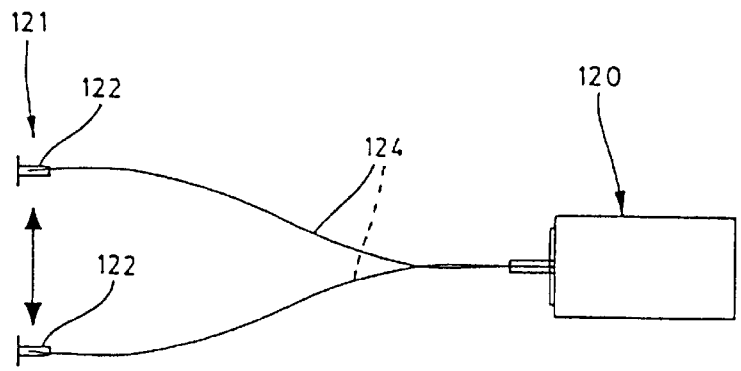
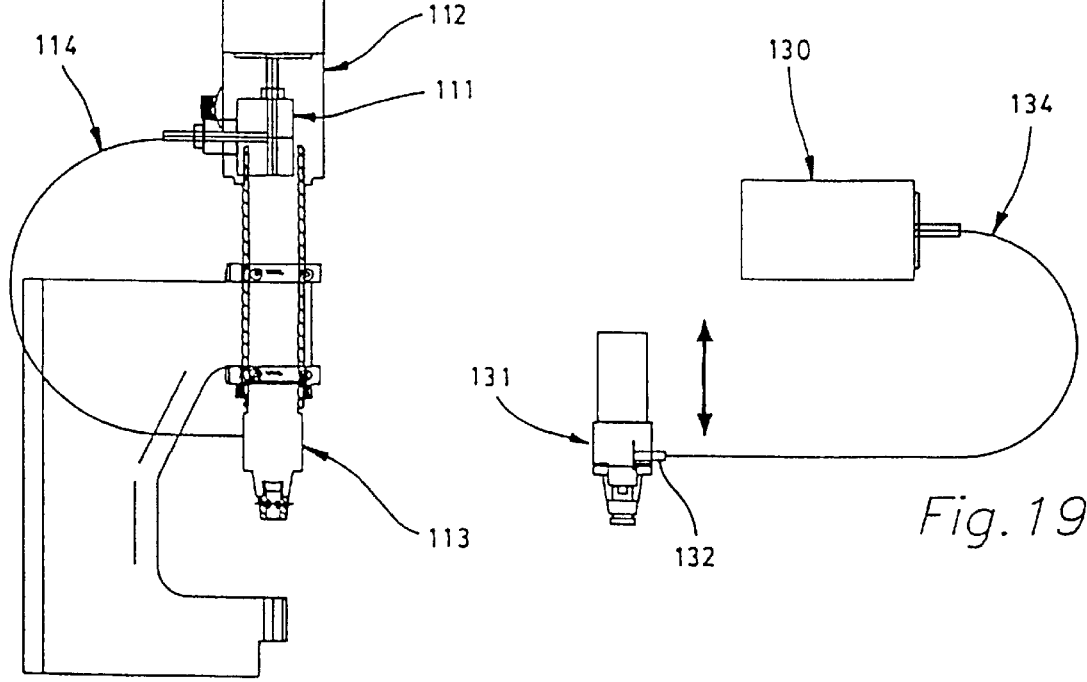
Fig. 18
Fig. 19
Fig. 17

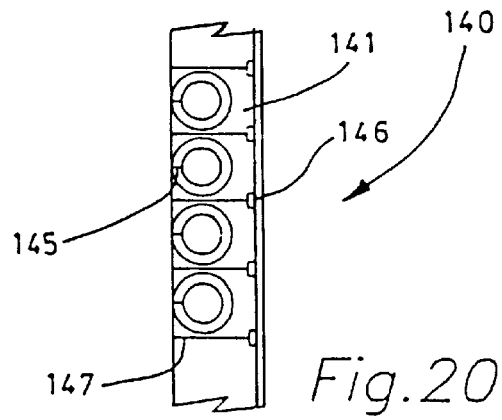
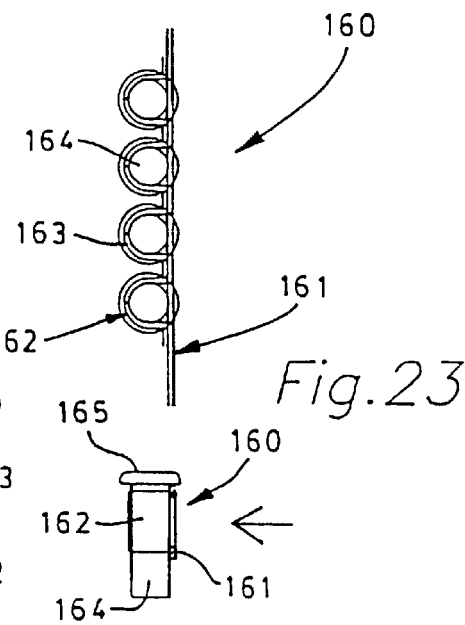
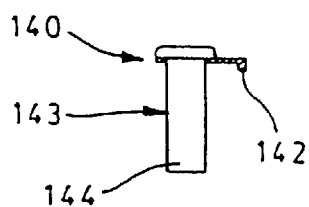
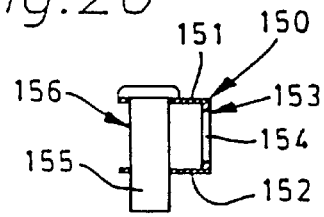
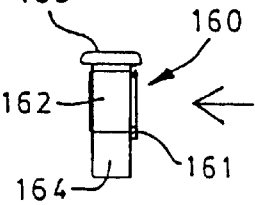
Fig.20  Fig.23
Fig.21  Fig.22  Fig.24
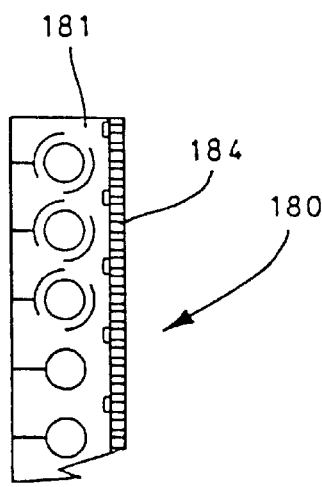
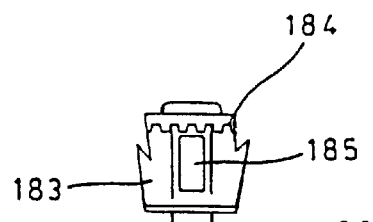
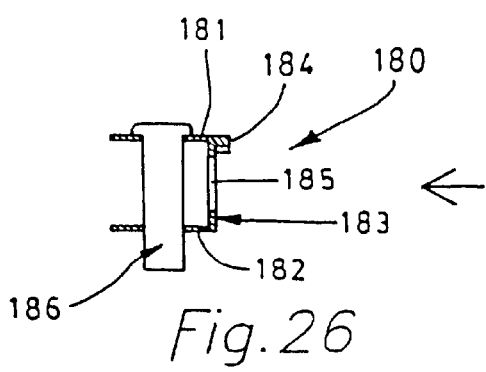
Fig.25  Fig.27  Fig.26

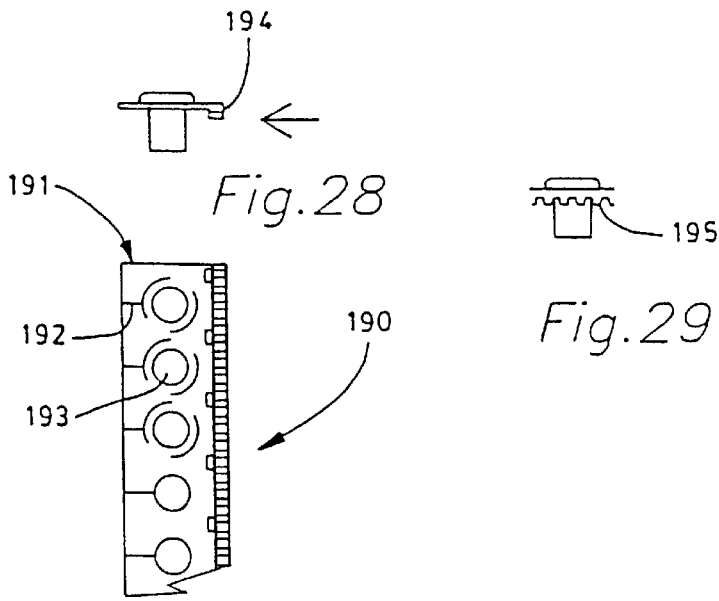
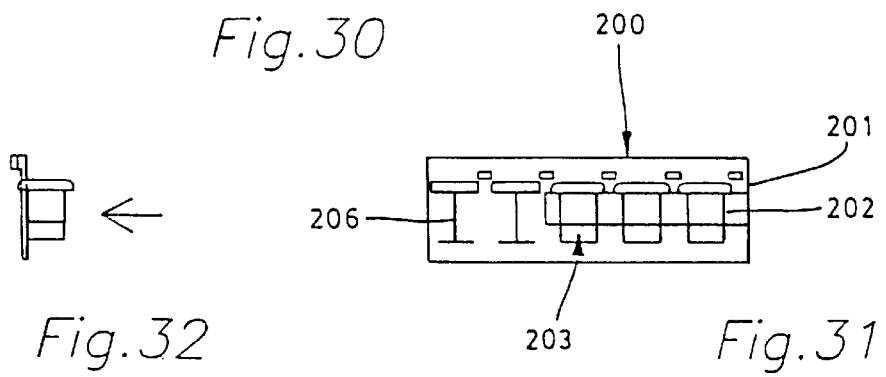
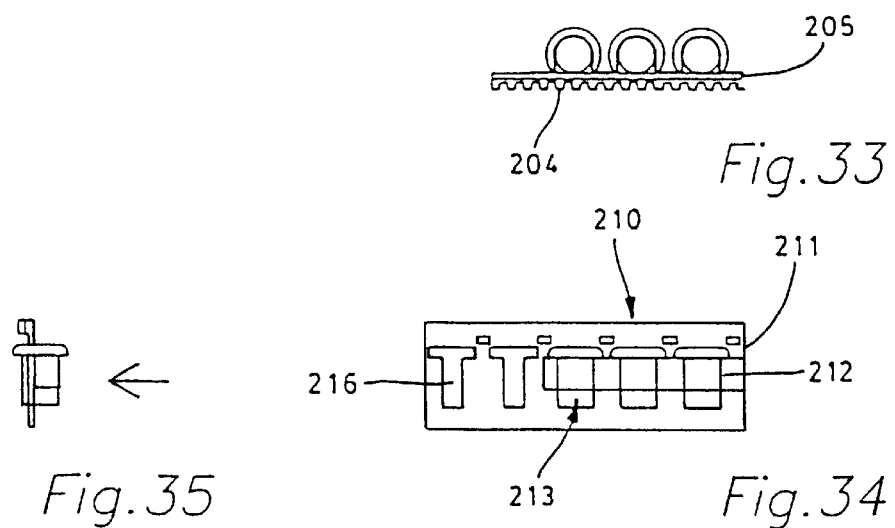
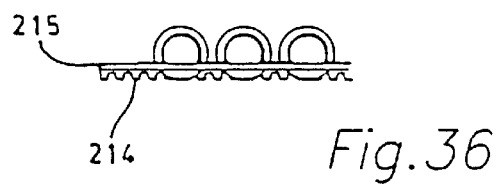

FEEDING HEAD FOR A FASTENER MACHINE

This application is a continuation of application Ser. No. 08/240,768, filed as PCT/AU92/00621, Nov. 20, 1992, now abandoned.

BACKGROUND OF THE INVENTION

1. Field of the Invention

This invention relates to fastening tools and fastener-carrying tapes therefore.

The term "fastener" shall include rivets, screws and other fastening devices.

2. Prior Art

U.S. Pat. No. 4,615,475 to Fuhrmeister discloses a feeder for headed fasteners, where the fasteners, mounted in tape, are sequentially advanced into alignment with the punch and die assembly of a fastening machine by an oscillating actuator, which is timed by the plunger holding the punch, the actuator releasably engaging the heads of the fasteners to advance the fasteners.

The feeder, and the fastening machine, have proved commercially successful in a wide range of industries. There are certain applications, however, such as in the automotive and white goods industries, where the dimensions of the feeding head preclude the use of the fastening machine to fasten components together, where limited space is available.

In addition, the minimum radius of curvature of the tape entering and leaving the feeder head also limits the reduction of size of the feeder hereinbefore described to suit such applications.

SUMMARY OF THE INVENTION

It is an objective of the present invention to provide an improved feeding head for the fastening machine which enables the fastening machine to be used in confined spaces.

It is a preferred objective to provide an improved carrier tape for the fasteners.

It is a further preferred objective to provide carrier tapes where the fasteners may be released from the carrier tape being pushed through, or transversely to, the webs of the carrier tapes.

It is a still further preferred objective to provide teeth means on the carrier tapes to enable the feeding head to accurately locate the fasteners in alignment with the punch and die of the fastening machine.

It is a still further preferred objective to provide a feeder where the fastener stems or shanks are engaged as the fasteners are advanced by the punch to prevent the fasteners from tilting or becoming misaligned with the die assembly.

It is a still further preferred objection to provide a feeding head in a remote, fixed position spaced from the punch and die assembly, with a different orientation, for improved access.

It is a still further preferred objection to provide a remote drive for the feeding head.

Other preferred objectives will become apparent from the following description.

The term "fastening machine" shall be hereinafter used to refer to fastening machines of the type disclosed in U.S. Pat. No. 4,615,475 discussed above, subject to the modifications and improvements hereinafter described and illustrated, but shall not be limited to such machines.

The term "stem" of a fastener shall be hereinafter used to also include a "shank" of a fastener.

In one aspect the present invention resides in a carrier tape for fasteners, the tape including:
- a substantially planar web interconnecting a pari of substantially parallel side flanges;
- a plurality of substantially equally spaced holes provided or formed in the web;
- at least one row of side holes, slots or protuberances provided along at least one side of the web;
- so arranged that the side holes, slots or protuberances are drivingly engageable by a feeding head for the fasteners; and
- the stems of the fasteners are releasable engageable in the holes and the fasteners are releasable from the web when pushed or urged in a direction substantially perpendicular to the web.

Preferably weakening lines are provided transversely of the web, preferably equally spaced between the holes.

Preferably, V-shape slots or grooves are provided in the side flanges in alignment with the weakening lines to provide bending axes for the tape.

Preferably the side holes or slots in the web interconnect the weakening lines in the web to the slots or groove in the side flange to enable the tape to follow a path with a small radius of curvature.

In a second aspect, the present invention resides in a carrier tape for fasteners, the tape including:
- a substantially planar web;
- a side flange along one side of the web;
- a plurality of substantially equally spaced holes provided or formed in the web, centrally or adjacent the other side of the web; and
- a respective cut, slot or weakening line interconnecting each hole to the other side of the web;
- so arranged that the stems of the fasteners are releasable engaged in the holes and the fasteners are releasable from the web when pushed or urged in a direction substantially transverse to the web away from the side flange.

In a third aspect, the present invention resides in a carrier tape for fasteners, the tape including:
- two or more parallel, spaced planar webs interconnected along one side by a side flange, the webs having aligned pairs of substantially equally spaced holes provided or formed centrally or adjacent the other side of the webs; and
- respective cuts, slots or weakening lines interconnect each hole to the other side of its web;
- so arranged that the stems of the fasteners are releasably engaged in aligned pairs of the holes and the fasteners are releasable from the webs when pushed or urged in a direction substantially transverse to the webs away from the side flange.

In fourth and fifth aspects, the carrier tapes of the second and third aspects are modified by the provision of the equally spaced holes along, and open to, the other side of the webs.

In a sixth aspect, the present invention resides in a carrier tape for fasteners, the tape including a substantially planar web;
- at least one side flange along the web; and
- a plurality of loops along one side of the web;
- so arranged that the stems of the fasteners are releasably engageable in the loops and the fasteners are releasable by urging the fasteners in a direction substantially transverse to the longitudinal axis of the web.

The loops may be formed by a second web, of lower mechanical strength than the primary web and preferably of reduced width, fixed to the primary web, for example, by RF welding or adhesives at substantially regular intervals between each loop. In an alternative embodiment, parallel elongate slots may be provided in the web and portions between the slots may be deformed out of the plane of the web to form the loops. In a further alternative embodiment, the loops may be formed by two or more strings, cords or strips laid along one side face of the web and secured thereto at spaced locations.

In the carrier tapes of the second to sixth aspects, slots, holes or like apertures, may be provided at equal spacings along the web for engagement with a driving means on the feeding head of a fastening machine. In addition, as an alternative, slots, holes, notches, grooves or like apertures may be provided in the side flange for engagement by the tape driving means on the feeding head.

Weakening lines or grooves, to define bending lines for the carrier tape, may be provided at substantially equal spacings along the web, preferably between each pair of adjacent fasteners.

The web of the carrier tape may be extruded from plastics material and may be fibre reinforced. The secondary web, or the strings or cords, may also be extruded from plastics material or formed from paper, cotton or other fibrous materials, or be co-extruded with the web.

In a seventh aspect, the present invention provides a feeding head for a fastening machine including:

a feeder block mountable on a plunger having a punch;

a guide path in the block;

a fastener guide passage, aligned with the punch, below the guide path;

carrier tape drive means to push or pull the carrier tape through the guide path; and stop means releasably engageable with the head and/or stem of the fastener, or indexing means operating on the carrier tape drive means, to cause the carrier tape to be selectively advanced so that on descent of the punch, the punch will drive the fastener from the carrier tape into the fastener guide passage, the carrier tape being held against movement until the punch is withdrawn from the carrier tape.

Preferably, the carrier tape is of the type of the first aspect hereinbefore described.

Preferably, an inlet guide passage or tube guides the carrier tape from a source such as a spool to the guide path, a similar outlet guide passage guiding the empty carrier tape from the guide path. Preferably, the inlet and outlet guide passages are parallel and perpendicular to the guide path, the carrier tape passing around rollers, wheels or sprockets as it changes directions entering and leaving the guiding path.

The sprockets may have rachet means to index the advance of the carrier tape and/or prevent its retraction as the plunger is advanced towards the die.

Head and/or stem stop means may be provided in the guide path to index the advance of the fasteners into alignment with the punch and the fastener guide passage, the stem stop means preferably being spring-loaded and retractable as the punch advances the fasteners from the carrier tape.

Preferably, the stems are releasably engaged by retractable rollers in the fastener guide passage to maintain the alignment of the fasteners with the punch and die as the fasteners are advanced by the punch.

Probe means such as a limit switch, proximity sensor, light switch or the like may be provided in the feeder block to sense when the fastener is aligned with the punch and die to shut off the carrier tape drive means and/or to initiate the advance of the punch towards the fasteners.

In an eighth aspect, the present invention resides in a feeding head for a fastening machine including:

a guide bush;

a plunger mounted for coaxial advance and retraction through a guide bush;

a punch on the leading end of the plunger;

a fastener delivery passage aligned with the plunger;

a guide path, spaced to one side of the guide bush, to guide a carrier tape of fasteners;

means to feed the carrier tape through the guide path; and transfer means to sequentially engage fasteners in the carrier tape in the guide path and transport the fasteners into a delivered position aligned with the punch and the fastener delivery passage.

Preferably, the guide bush is mounted in a cylinder. The cylinder is preferably mounted on a mounting block mounted on a slide assembly on one jaw of the frame of a fastening machine. Actuator means are provided to raise and lower the mounting block on the jaw.

Preferably, the fastener delivery passage is aligned with the fastener upsetting die on the other jaw. Preferably, a pair of spring load stops, e.g. profiled rollers, are provided adjacent the fastener delivery passage to releasably engage the stems of the fasteners when transported by the transfer means, the stops being movable apart by the punch as it advances the fasteners through the fastener delivery passage.

Preferably, the guide path is profiled to support the carrier tape as it travels in a path transverse to the jaws of the fastener frame and spaced inwardly of the guide bush.

The means to feed the carrier tape may include indexing wheels, sprockets or blocks which engage the carrier tape and/or the fasteners, to sequentially advance the fasteners into alignment with the transfer means. The carrier tape may be the tape of the first to third aspects of the present invention.

The transfer means preferably includes a pusher blade which engages the fastener stems, the pusher blade being reciprocally movable by a hydraulic or pneumatic cylinder, solenoid or mechanical actuator, to push the fasteners free from the tape to the delivered position.

Preferably, the pusher blade engages the stems just below the fastener heads, and may optionally also engage the stems below the carrier tape and/or the fastener heads.

In a ninth aspect, the present invention resides in a flexible drive for a fastening tool including:

a motor mounted on or adjacent a frame of a fastening machine, the machine having an upper jaw carrying a fastening head with a punch and lower jaw having an upsetting die;

at least one sprocket on the upper jaw and movable therewith to advance a fastener-carrying tape to index fasteners into alignment with the punch;

a right-angled drive having an output operably connected to the sprocket; and a telescopic drive shaft operably connecting the input of the right-angled drive to the motor, so arranged to maintain operable driving connection between the motor and the right-angled drive as the fastener head or punch is advanced towards, or retracted from, the lower jaw.

In a tenth aspect, the present invention resides in a flexible drive for a fastening machine including:

a motor mounted on or adjacent a frame of a fastening machine, the machine having a fastening head having a punch and a lower jaw having an upsetting die;

at least one sprocket on the fastening head and movable therewith to advance a fastener-carrying tape to index fasteners into alignment with the punch; and a right-angled drive having an input operably connected to the motor and its output operably connected to the sprocket by a flexible cable drive to maintain operable driving connection between the motor and the sprocket as the fastening head or punch is advanced towards, or retracted from, the lower jaw.

In an eleventh aspect, the present invention resides in a flexible drive for a fastening machine of the type having an upper jaw having a fastening head with a punch and a fixed lower jaw having an upsetting die; and at least one sprocket on the fastening head and movable therewith to advance a fastener-carrying tape to index fasteners into alignment with the punch, the flexible drive including:

a motor mounted remote from the frame; and a flexible cable drive interconnecting the motor to the sprocket to maintain operable driving connection therebetween as the fastening jaw or punch is advanced towards, or retracted from, the lower jaw.

The motor, right-angled drive, or the sprockets may incorporate a rachet, cam, a one-way roller clutch, or like one-way drive means so that the carrier tape can only travel in one direction, that is, to advance the fasteners to the punch, during the fastening cycle.

BRIEF DESCRIPTION OF THE DRAWINGS

To enable the invention to be fully understood, a number of preferred embodiments will now be described with reference to the accompanying drawings, in which:

FIG. 2 is a sectional side view of a first embodiment of the feeder head;

FIG. 3 shows plan and end views of a fastener stop in the feeder head;

FIG. 4 shows plan and sectional side views of fastener guide rollers in the feeder head;

FIGS. 5 and 6 are sectional side views of a second embodiment of the feeder head with the punch in advanced, and retracted positions, respectively;

FIGS. 7 and 8 are end elevation and side elevation views of the punch and gear wheel, respectively, in the feeder head of FIGS. 5 and 6;

FIGS. 15 to 19 are respective schematic views of first to fifth embodiments of flexible drives for the feeder heads;

FIGS. 20 and 21 show respective plan and end views of a second embodiment of the carrier tape;

FIG. 22 is an end view of a third embodiment of the carrier tape (having the same plan view as FIG. 20);

FIGS. 23 and 24 are respective plan, and end views of a fourth embodiment of the carrier tape;

FIGS. 25 to 27 are respective plan, end and side views of a fifth embodiment of the carrier tape;

FIGS. 28 to 30 are respective end, side and plan views of a sixth embodiment of the carrier tape;

FIGS. 31 to 33 are respective side, end and plan views of a seventh embodiment of the carrier tape;

FIGS. 34 to 36 are similar views of an eighth embodiment of the carrier tape;

DETAILED DESCRIPTION OF THE PREFERRED EMBODIMENTS

Figure 1:
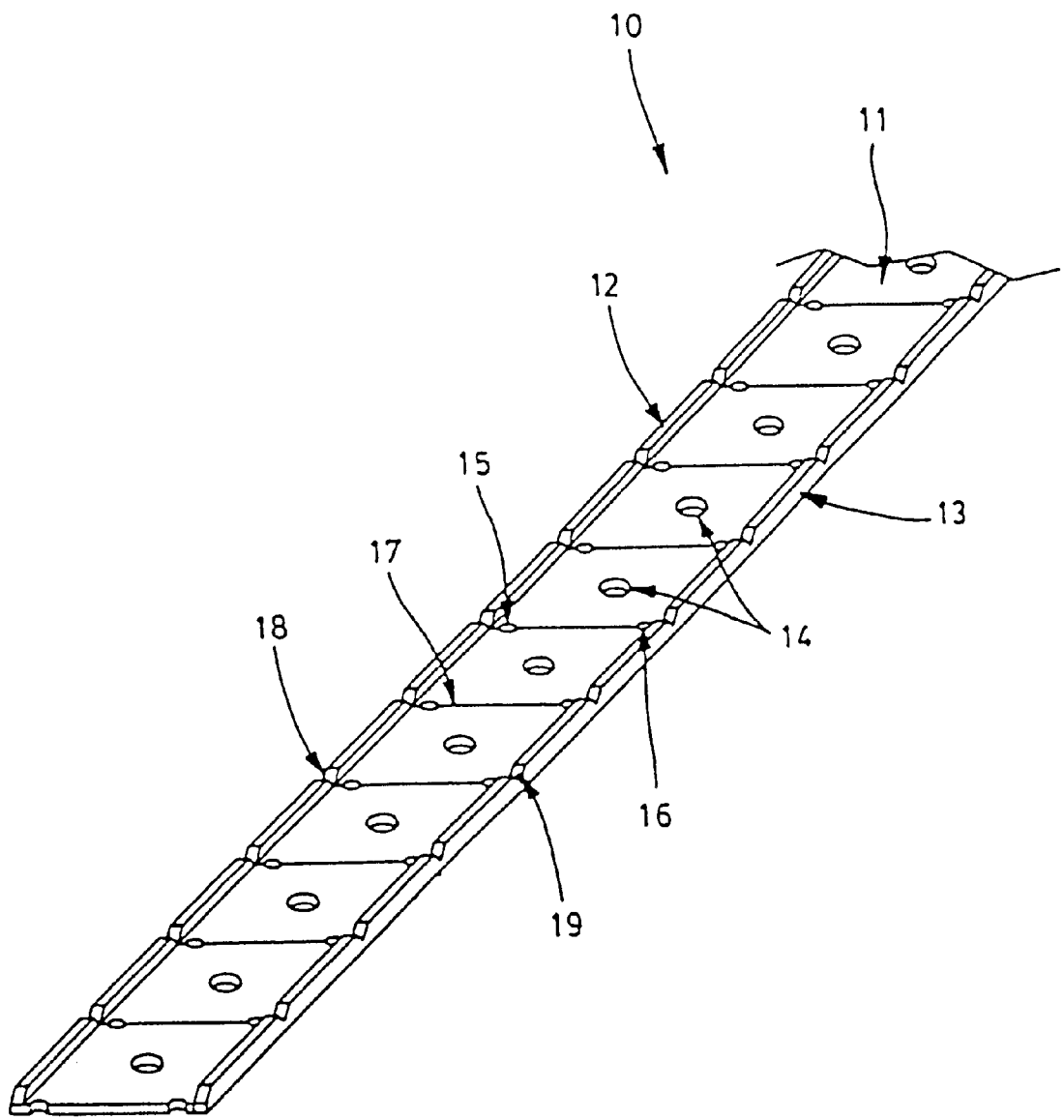
FIG. 1 is an isometric underside view of a first embodiment of a carrier tape.
Figures 9, 10:
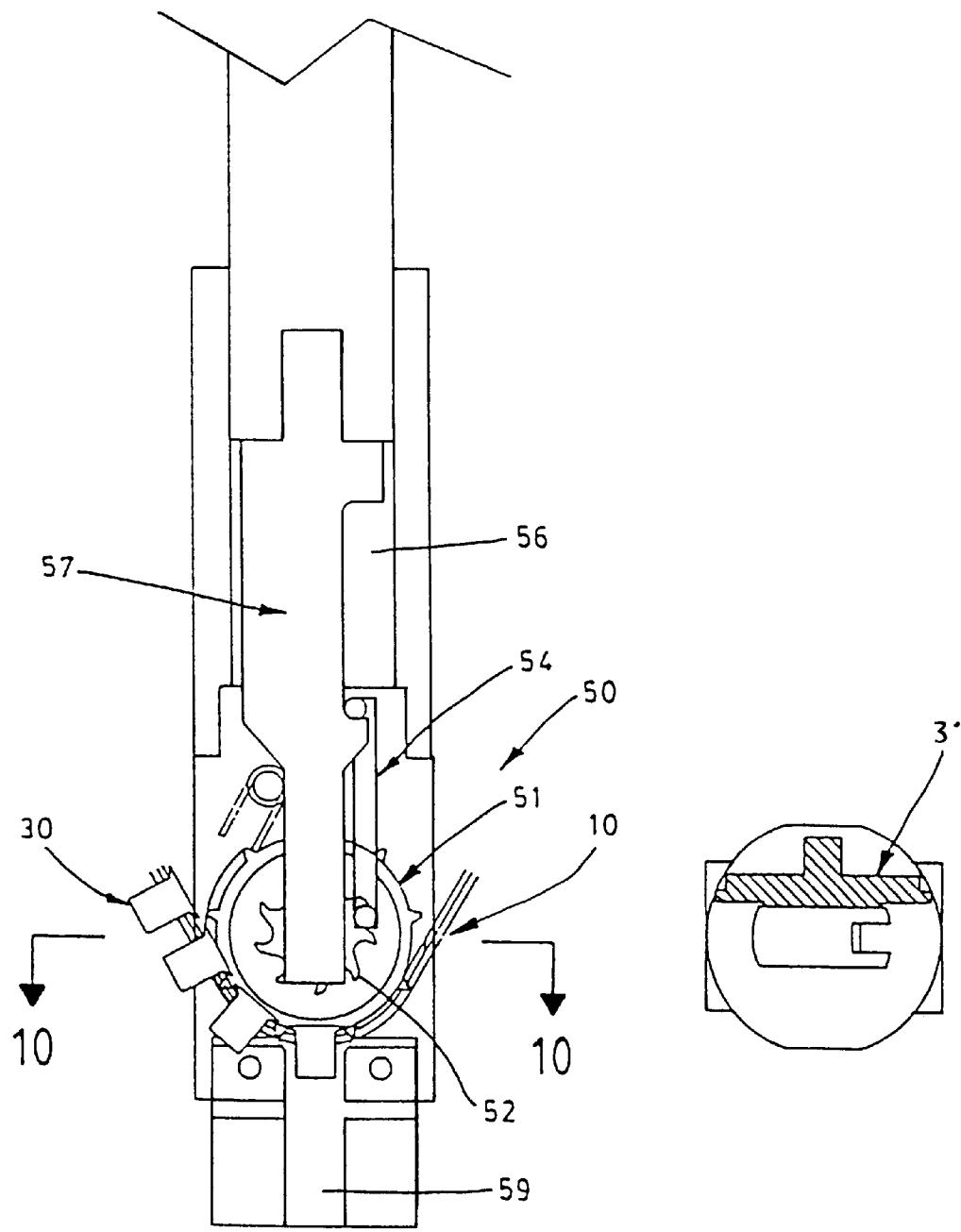
FIG. 9 is a side view of the feeder head.
FIG. 10 is a sectional view taken on line 10—10 on FIG. 9.

Referring to FIG. 1, the fastener carrier tape 10 is extruded from plastics material, for example, polypropylene or polyethylene and has a planar web 11 interconnecting parallel downwardly directed side flanges 12, 13. Holes 14 are formed in the web 11 undersize relative to the stem diameter of the fasteners, for example, rivets. The holes 14 may be formed by driving the fastener stems into the web 11.

Driving holes 15, 16 are provided in pairs along the sides of the web 11, adjacent the side flanges 12, 13 and may be engaged by pins on drive sprockets in the feeder heads.

Weakening lines 17 extend transversely of the web 11, intermediate of the holes 14, interconnect the drive holes 15, 16, and are aligned with V-shaped slots 18, 19 in the side flanges 12, 13.

The weakening lines 17 and slots 18, 19 define bending axes for the tape 10 to pass around a sprocket wheel, block, roller or wheel of small radius.

To assist the advance of the fasteners from the carrier tape 10 by the punch of a fastening machine, or more radial slits or weakening lines may radiate from the holes 14, and the slits or weakening lines folding or tearing as the fastener heads pass through the holes 14. The weakening lines 17 relieve the tension in the tape 10 when it is bent about a small radius and the fasteners are less likely to be inadvertently released from the holes 14.

Referring now to FIGS. 2 to 4, the feeder head 20 is mounted on the plunger 21 of a riveting machine provided with a punch 22 and with a hydraulic cylinder assembly and retracting spring means (not shown). The structure just described is illustrated in U.S. Pat. No. 4,615,475 referred to above and does not per se form part of the present invention.

A horizontal tape guide path 23 interconnects an inlet tape guide passage 24 and outlet guide passage 25 through the feeder head 20. A fastener guide passage 26 extends downwardly from the guide path 23 in alignment with the punch 22 and anvil.

The carrier tape 10 passes through the guide path 23 and passes around a pair of sprocket wheels 27 on one side of the feeder head 20, the sprocket wheels having pins 28 to engage the driving holes 15, 16 in the carrier tape 10. Rollers 29 maintain the carrier tape 10 in driving engagement with the sprocket wheels 27.

A rotary motor (not shown) either drivably engages the carrier tape 10 remote from the feeder head 20, or drives the sprocket wheels 27, to advance the carrier tape and fasteners 30 to and through the feeder head 20.

The stems 31 of the fasteners 30 engage a retractable stem stop roller 32 (see FIG. 3), provided with a spring 33 which enables the stem stop roller 32 to be retracted when the punch 22 drives the fasteners 30 from the carrier tape 10 into the fastener guide passage 26. The heads of the fasteners also engage a head stop (not shown).

A spring loaded finger 34 with spring 35 is hingedly mounted in the feeder head 20 and engages the finger 36 of a micro-switch 38 connected to the rotary motor, so arranged that when the fastener 30 is aligned with the punch 22 and anvil (not shown), the micro-switch 38 will switch off the rotary motor.

When the punch 22 is advanced during the fastening cycle, the fastener 30 is expelled from the carrier tape 10 into the fastener guide passage 26, to be aligned and supported by a pair of retractable fastener guide rollers 39, 40 (see FIG. 4) provided with springs 41. Further advances of the punch 22 drive the fasteners through the sheets/panels being fastened, the stem 31 of the fastener being deformed by the anvil of the upsetting die. The enlarged diameter portion 22A of the punch 22 holds the finger 34 in the "off" position for the micro-switch 38. When the punch 22 has been retracted from the tape 10, the finger 34 moves to the "on" position for the micro-switch 38 to enable the next fastener to be brought into alignment with the punch 22, to enable the fastening cycle to be repeated.

In a second embodiment, (see FIGS. 5–10), the feeder head 50 has a sprocket wheel 51 which engages the carrier tape 10. The sprocket wheel 51 has a plurality of teeth 52 engageable by a pin 53 on a panel 54 (see FIG. 7) mounted in the feeder head 50, a second pin 55 being engageable in a slot 56 in the punch 57 advanced by a hydraulic piston 57a against a retraction spring 57b. A spring 58 bears against the panel 54.

As the punch 57 is advanced to expel the aligned fastener 30 (not shown) from the carrier tape 10 into the tape guide passage 59, the pin 53 on the panel 54 rides over a tooth 52 on the driving sprocket 51. As the punch 57 is withdrawn, the pin 53 engages the tooth 52 to cause the sprocket wheel 51 to advance the carrier tape 10 to bring the next fastener 30 into alignment with the punch 57.

Figure 11:
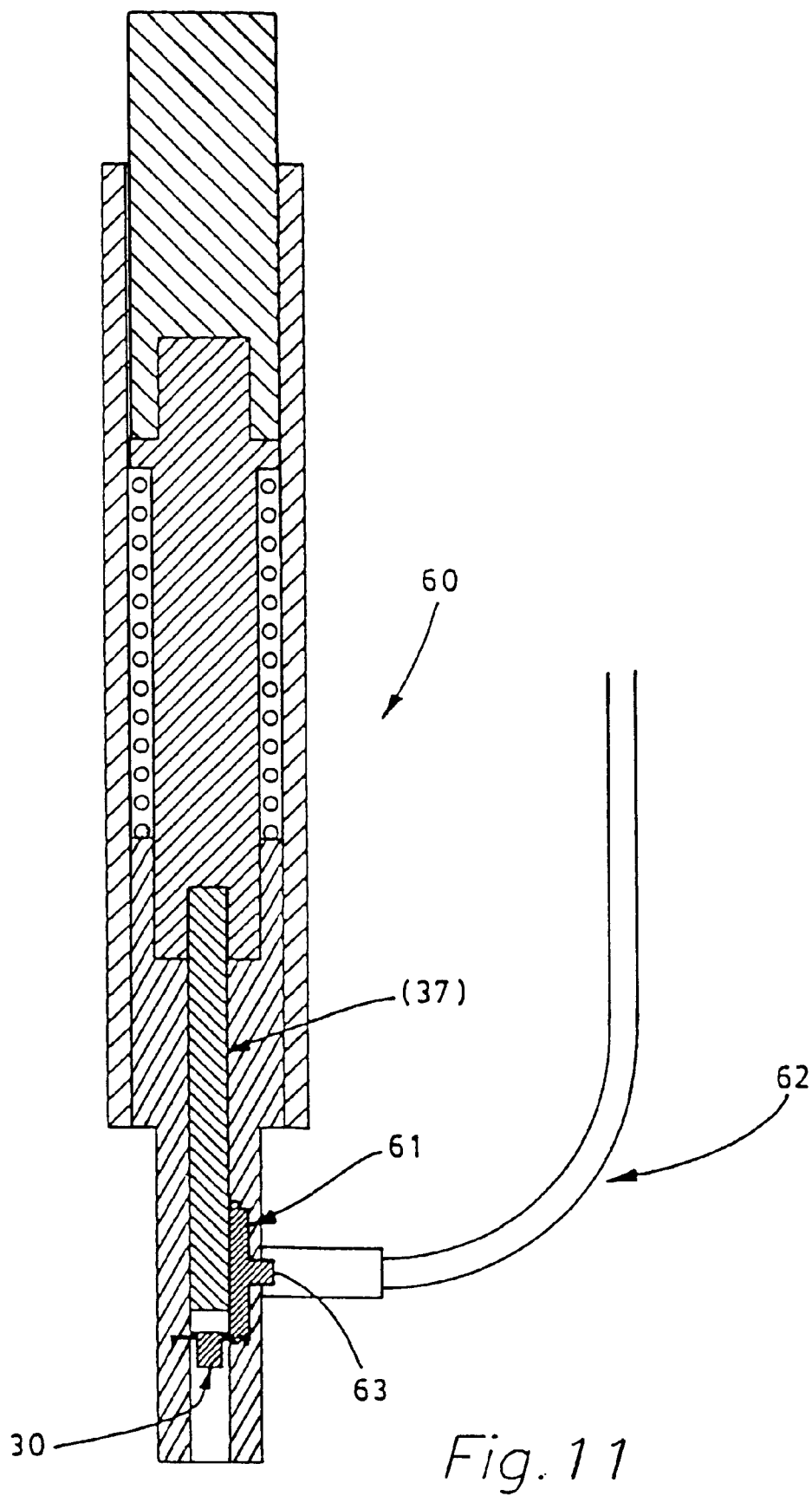
FIG. 11 is a sectional end view of the feeder head, showing an optional flexible drive for the gear wheel.

In a modified embodiment (see FIG. 11), the feeder head 60 has a sprocket wheel 61, which drivably engages the carrier tape 10, driven from a remote rotary motor by a flexible drive 62, for example, a Bowden cable, connected to the axle 63 of the sprocket wheel 61.

Figures 12, 12A:
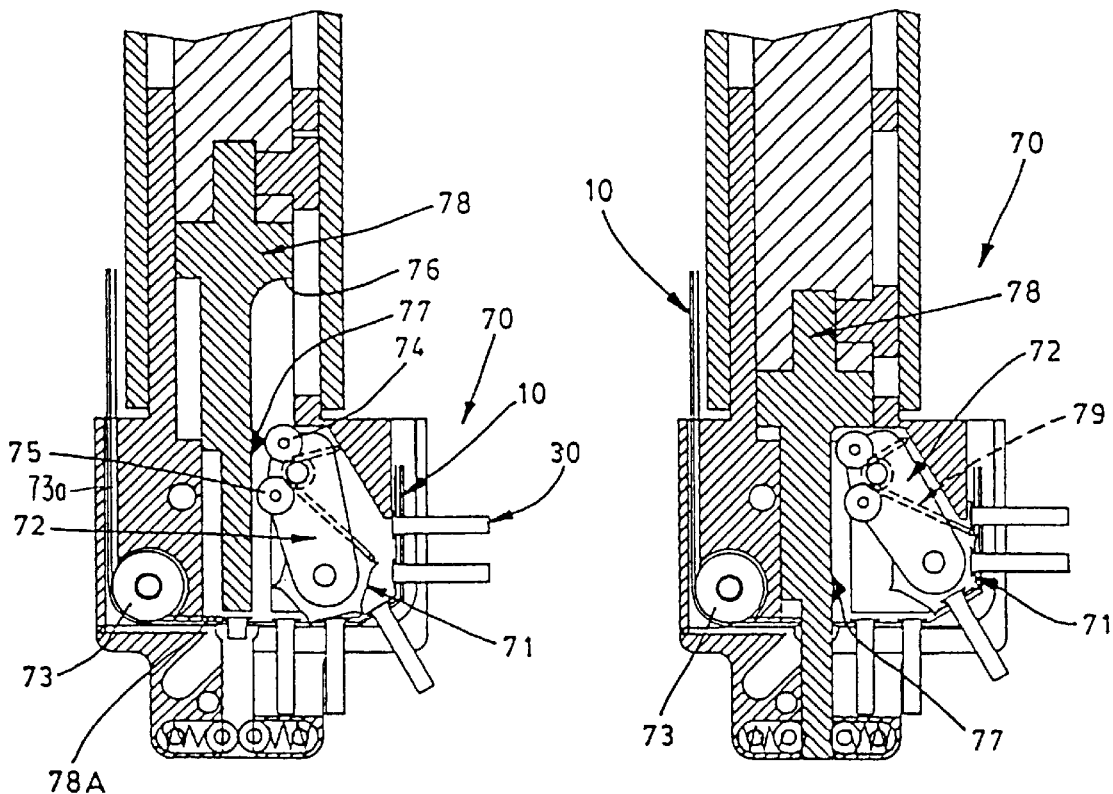
FIGS. 12 and 12a are respective side views of a third embodiment of the feeder head.

In the embodiment of the feeder head 70 shown in FIGS. 12 and 12a, the sprocket wheel 71 is rotatably mounted on one end of a rocker arm 72 hingedly mounted in the feeder head 70, the sprocket wheel 71 engaging the carrier tape 10 which is guided from the feeder head 70 by guide rollers 73 to a vertical guide path 73a.

A pair of rollers 74, 75 on the rocker arm 72 engage respective abutments 76, 77 on the side of the punch 78.

As the punch 78 is advanced, it expels the aligned fastener 30 from the carrier tape 10, and while it is engaged in the hole 14 of the carrier tape, the abutment 76 engages the roller 74 to move the rocker arm 72 and sprocket wheel 71 to the advance position shown in-FIG. 12a. When the punch 78 is retracted from the carrier tape 10, the abutment 77 engages the roller 75 to move the rocker arm 72 and sprocket wheel 71 to the retracted position in FIG. 12 where a fastener 30 is brought into alignment with the punch for the next fastening cycle, the fastener head engaging a head stop 78A. In this embodiment the sprocket wheel 71 pushes, not pulls, the carrier tape 10 into the feeder head 70.

Spring 79 stops the rotation of the sprocket wheel 71 as the rocker arm advances the carrier tape, that is, as it moves from the position in FIG. 12a to the position in FIG. 12, but allows the sprocket wheel 71 to rotate in an anti-clockwise direction as it is moved to engage the next driving slots 15, 16 in the carrier tape, that is, to the position in FIG. 12a.

Figure 14:
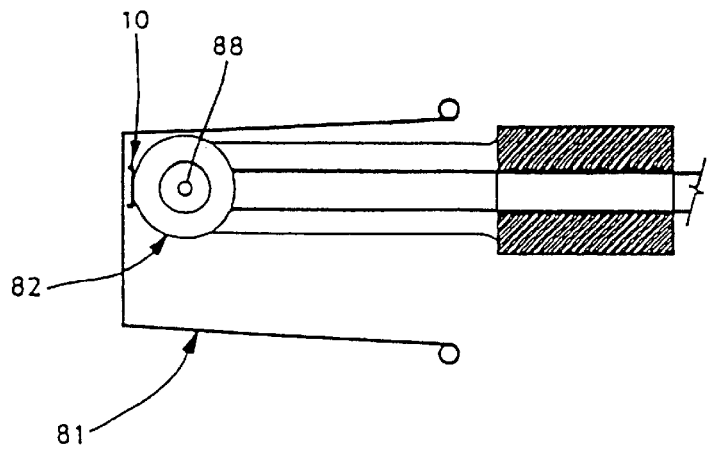
FIGS. 13 and 14 are respective side and end views of a fourth embodiment of the feeder head.
Figure 13:
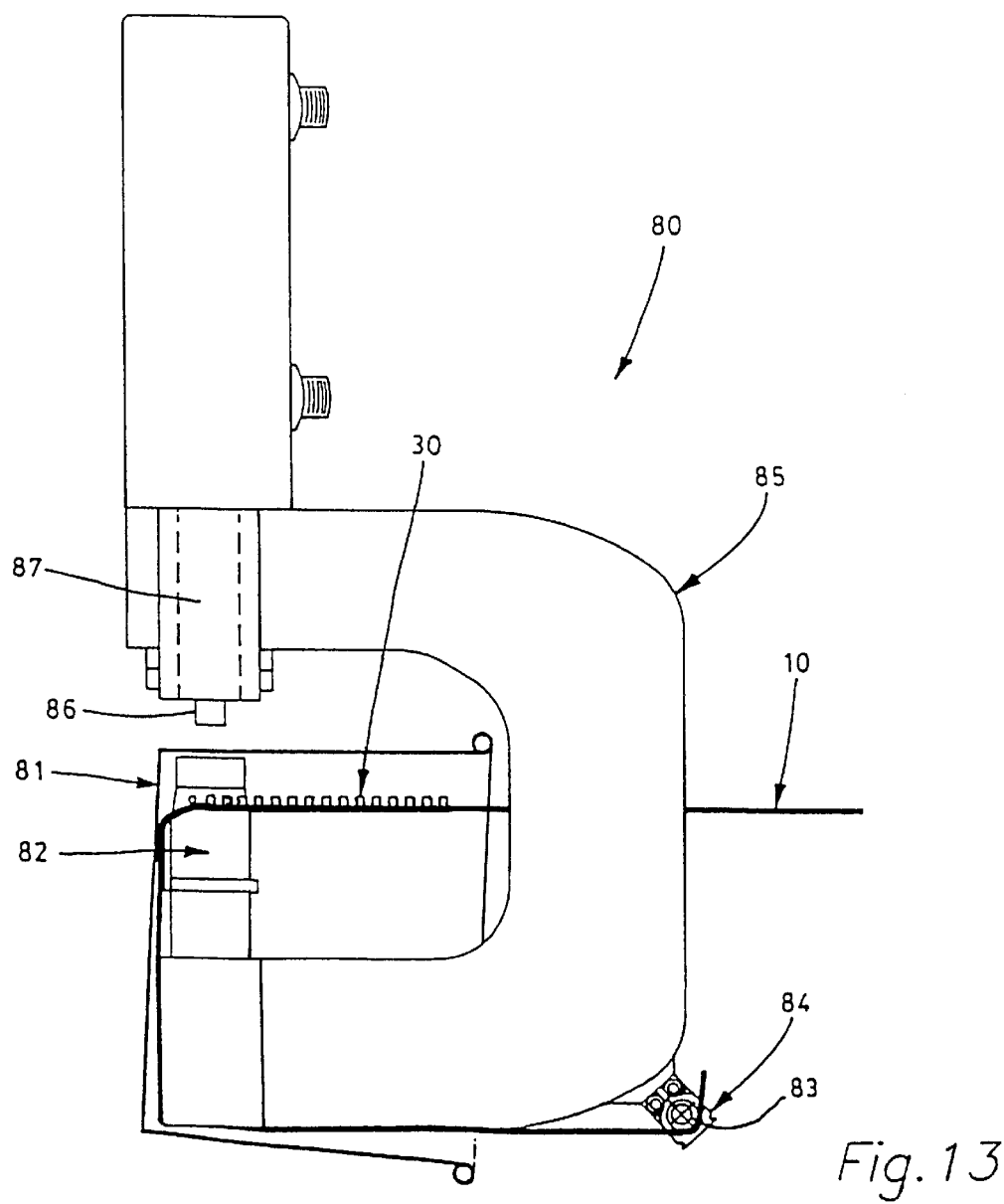

Referring now to FIGS. 13 and 14, the fastening machine 80, for example, for the manufacture of bread tins 81, has the carrier tape 10 (with fasteners 30) drawn past the feeder head 82 by a sprocket wheel 83 on a rotary motor 84, the motor 84 being mounted on the C-frame 85 of the fastening machine 80. The fastening machine 80 has a retractable anvil 86, on a cylinder 87, which is timed to advance in opposition to the punch 88 during the fastening cycle.

Figures 15, 16:
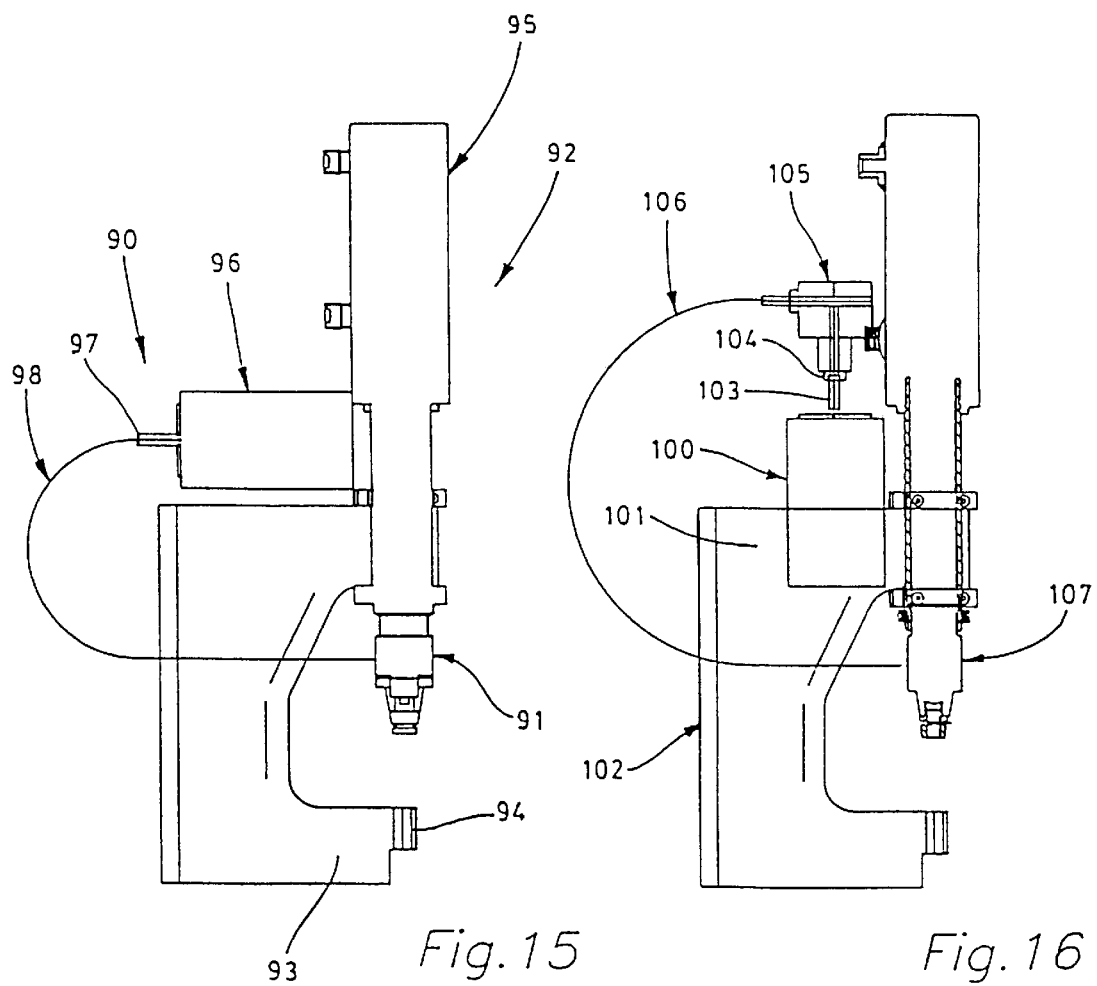

FIG. 15 is a schematic view of a first flexible drive 90 for a fastening head 91 of a fastening machine 92. The fastening machine 92 has a C-frame with the fastening head 91 mounted for vertical movement, and a lower jaw 93 with an upsetting die 94 aligned with the punch (not shown) of the fastening head 91. The feeder head for the carrier tape is incorporated in the fastening head 91. A ram assembly 95 advances the fastening head 91 and punch towards the die 94 in advance of the fastener, for example, a rivet, with the river piercing the workpiece to be connected and being upset to connect them together.

One or more sprocket wheels, as hereinbefore described, drivably engage the carrier tape 10 to advance the fasteners 30 into alignment with the punch and die 94.

An electric motor 96 is mounted on the ram assembly 95 and has an output shaft 97 connected to one or both sprocket wheels by a flexible cable drive 98, for example, a Bowden cable.

The sprocket wheels incorporate a rachet assembly so that the carrier tape 10 can only be drawn from a supply spool (not shown) to advance the fasteners into alignment with the punch and die, that is, as the fastening head 91 moves down towards the die 94, the carrier tape may be pulled from the spool and the tape advanced within the fastening head 91 by the sprocket wheels, but on the upward stroke of the fastening head 91, the carrier tape will not be able to travel in the reverse direction.

In the embodiment of FIG. 16, the motor 100 is mounted on the upper jaw 101 of the C-frame 102 and the output shaft 103 of the motor and the drive input shaft 104 of a right-angled drive 105 are direct coupled or common.

A flexible cable drive 106, for example, a Bowden cable connects the drive unit 105 to the fastening head 107 to accommodate the vertical movement of the latter.

In the embodiment of FIG. 17, the motor 110 and right-angled drive 111 are mounted on the ram assembly 112, and the right-angled drive 111 is connected to the fastening head 113 via the flexible cable drive 114.

In the embodiments of FIGS. 18 and 19 respectively, the motors 120, 130 are mounted remotely from the fastening heads 121, 131 and the motors 120, 130 are connected direct to the sprockets 122, 132 via the flexible drive cables 124, 134 to accommodate the vertical travel of the fastening heads 121, 131 indicated by the double-headed arrows.

It will be noted that the sprockets 124, 134 may be directly or indirectly driven and the rachet, or similar one way drive means, may be provided at the motor 96, 105, 110, 120, 130 the right-angled drive 105, 111, fastening heads 91, 107, 113, 121, 131 or at the sprockets 124, 134 themselves.

Referring to FIGS. 20 and 21, the fastener carrier tape 140 is extruded from plastics material, for example, polypropylene or polyethylene which may be fibre-reinforced and has a planar web 141 with an inverted side flange 142. Holes for the fasteners 143 may be performed and are preferably undersize to receive and engage the stems 144 of the fasteners, or may be formed by driving the fasteners 143 into the web 141, the holes being formed adjacent the opposite side of the web 141 and connected to that side by slits or weakening lines 145 (see FIG. 20).

Driving holes 146 are provided in equally spaced relationship along the side of the web 141 adjacent the side flange to be engaged by pins on a drive sprocket.

Weakening lines 147 extend transversely of the web 141, intermediate the fastener holes, and may be aligned with slots (not shown) in the side flange 142 to enable the carrier tape 140 to pass around a sprocket wheel, block, roller or wheel of small radius.

Referring now to FIG. 22, the carrier tape 150, also extruded of plastics material, has a pair of spaced webs 151, 152, with fastener holes, and weakening lines as for carrier tape 140, where the side flange 153 interconnects the webs 151, 152 and is provided with driving holes 154 to be engaged by the driving sprockets.

As this carrier tape 150 engages the stem 155 of the fastener 156 at two points, it is particularly suitable for fasteners with long stems.

With both carrier tapes 140, 150, the fastener 143, 156 is released by pushing it in a direction transverse to the longitudinal axis of the tape and away from the side flange 142, 153.

Referring now to FIGS. 23 and 24, the carrier tape 160 has a vertical planar web 161 of extruded plastics material, to which is fixed, at spaced intervals, a co-extruded secondary web 162, of reduced mechanical strength, to form spaced loops 163 engageable by the fastener stems 164, in the nature of a bandolier.

In a feeder, the fasteners 165 are pushed away from the main web 161 to rupture the secondary web 162 to release the fasteners from the loops 163.

The secondary web 162 may be replaced by strings, strips or cords to form fracturable loops. Driving holes may be provided along one, or both, sides of the main web 161.

The tape 180 of FIGS. 25 to 27 is of channel section and has a pair of spaced webs 181, 182 similar to web 141 to tape 140, connected by a slotted spacer 183, again with rack-like teeth 184, engageable by a tooth-wheel or drive gear in the feeder head. The slots 185 in the spacer 183 enables a transfer mechanism to engage, and eject, the fastener 186 from the tape.

In the tape 190 of FIGS. 28 to 30, the planar web 191 has slits 192 interconnecting the holes 193 to the side of the webs 191 spaced from the flange 194 provided with the teeth 195.

In the tapes 200, 210 of FIGS. 31 to 33, and 34 to 36 respectively, the webs 201, 211 have loops 202, 212 to engage the fasteners 203, 213 and rack-like teeth 204, 214 on flanges 205, 215. The fasteners 203, 213 are pushed through slits 206 or holes 216 through the webs 201, 211 to eject the fasteners.

Figure 37:
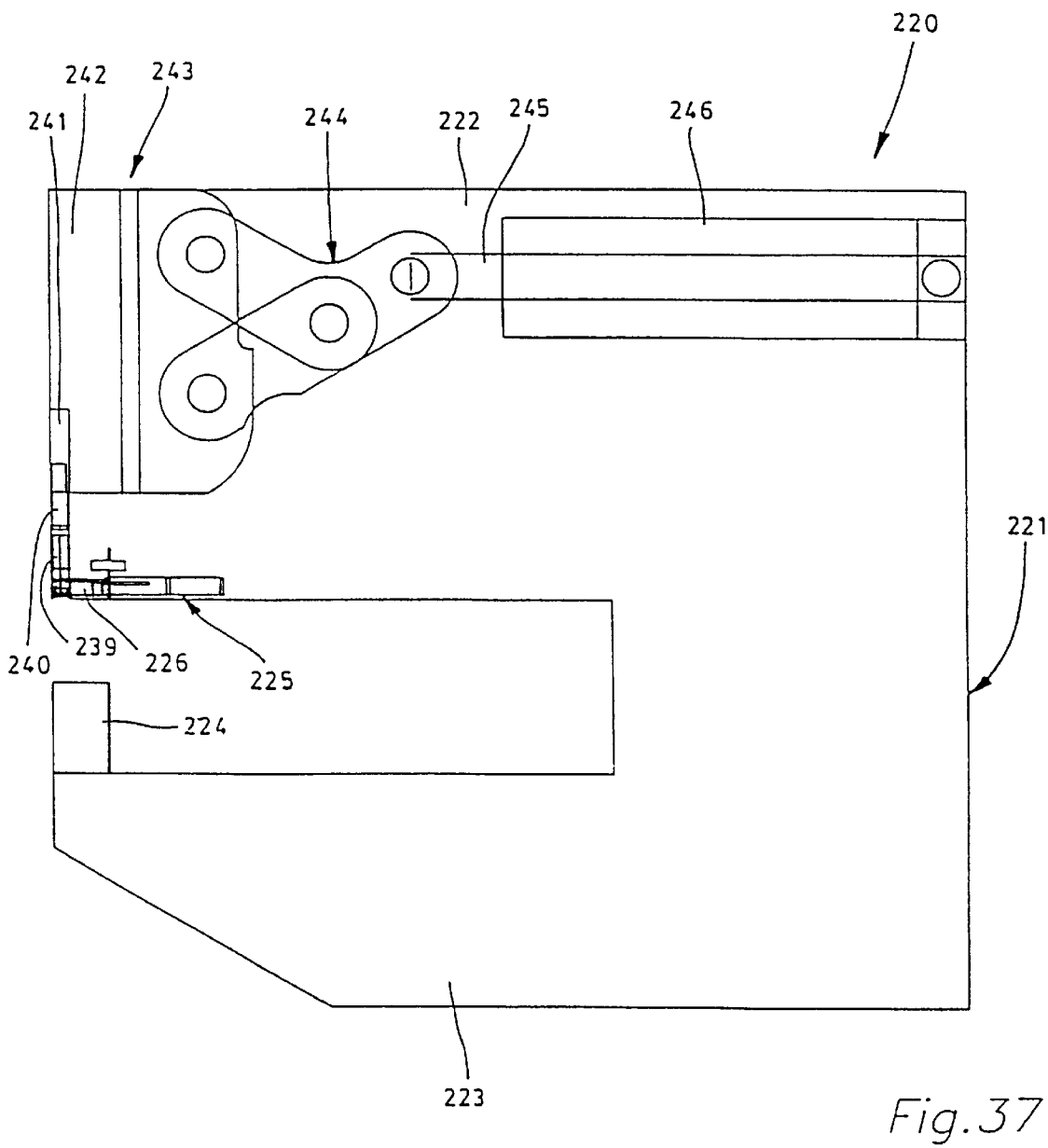
FIG. 37 is a schematic side view of a fastening machine with a remote feeder head.

Referring now to FIG. 37, the fastening machine 220 can be designed to operate in very confined spaces, such as in the corner of two sheet metal components at the apex or nose of the machine.

The fastening machine 220 has a C-frame 221 with an upper jaw 222, and a lower jaw 223 with the fastener upsetting die 224.

Figure 38:
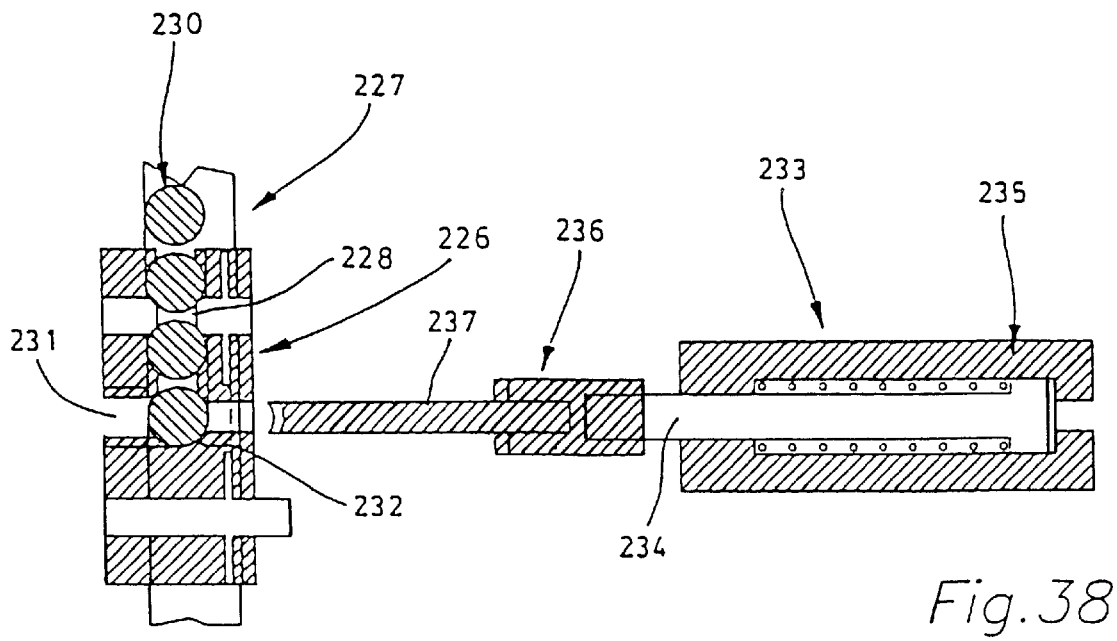
FIGS. 38 and 39 are respective sectional plan and side views of the fastener transfer mechanism for the feeder head of FIG. 37.
Figure 39:
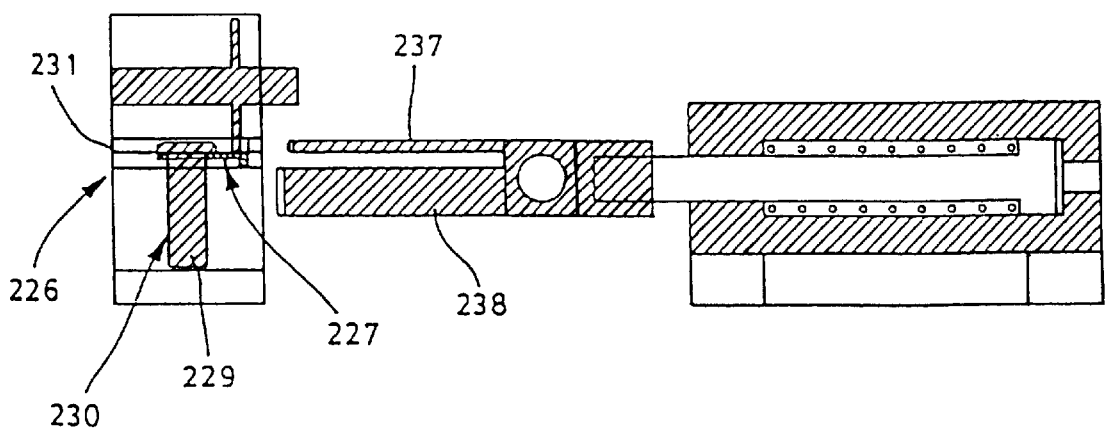
Figure 40:
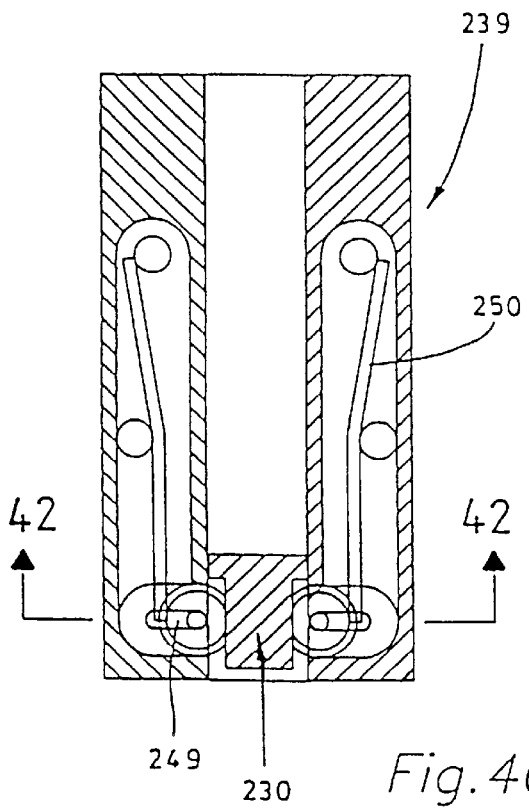
FIGS. 40 and 41 are sectional side views of respective fastener support mechanisms in the fastening machine.

A fastener feeder 225 is mounted in or on the upper jaw 223. A tape guide block 226 (see FIGS. 38 and 39) is profiled to match the appropriate carrier tape 227, with a slot 228 on the upstream side of the stems 229 of the fasteners 230. A transfer slot 239 extends transversely of the guide block 227 and the junction of the slots 228, 231 forms a stop 232 for the fasteners 230.

A transfer mechanism 233 has a reciprocating plunger 234 mounted in a pneumatic or hydraulic cylinder 235, or solenoid, and has a head 236 with an upper finger 237 to engage the fastener head and a lower finger 238 to engage the fastener stem 229. From the retracted position shown in FIG. 38, the plunger 234 is advanced to engage and push each fastener 230 sideways out of the carrier tape 227 to advance the fastener to a delivery position where the fastener 230 is aligned with the punch on the plunger in the guide bush (see FIG. 37). The guide bush 239 is slidably mounted on the plunger and urged to an advanced position by a compression spring, the plunger being mounted in a hydraulic ram 240. The ram 240 is mounted on a support block 241, in turn mounted on a slide assembly 243 on the upper jaw 222. The support block 241 is vertically movable via an actuating linkage 244 connected to the piston rod 245 of a hydraulic cylinder 246.

Figure 42:
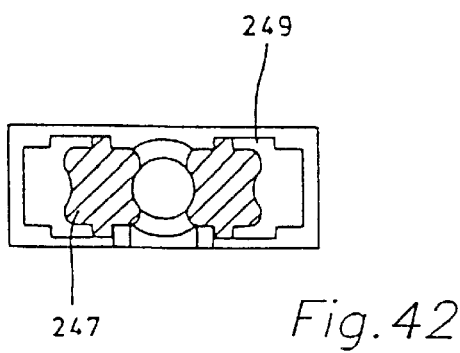
FIG. 42 is a sectional view taken on line 42—42 on FIG. 40.
Figure 43:
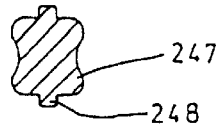
FIG. 43 is a sectional plan view of a fastener guide roller of FIG. 42.

In the advanced position, the fastener 230 is releasably supported by a pair of profiled rollers 247 (see FIGS. 42 and 43), the axles 248 thereof being slidably rotatably engaged in slots 249 (see FIG. 42) in the guide 239. Leaf springs 250 urge the rollers 247 into engagement with the fastener 230. As the fastener 230 is moved to the advanced position by the transfer mechanism 233, the rollers 247 retract to enable the fastener 230 to be located directly below the punch and above the upsetting die 224.

After the fastener 230 has been placed between, and supported by, the rollers 247 in the guide bush 239, and the transfer mechanism 233 has been retracted, the ram 246 is timed to move the support block 242 downwardly until the guide bush 239 engages the metal sheets to be fastened. Ram 241 is then operated to advance the punch to engage the fastener 230 and push it down below the rollers 247, the fastener piercing the metal sheets and being deformed on the upsetting die 224.

The sequence is reversed.

The next fastener 230 is advanced to the stop 232 and the fastening sequence is repeated.

Figure 41:
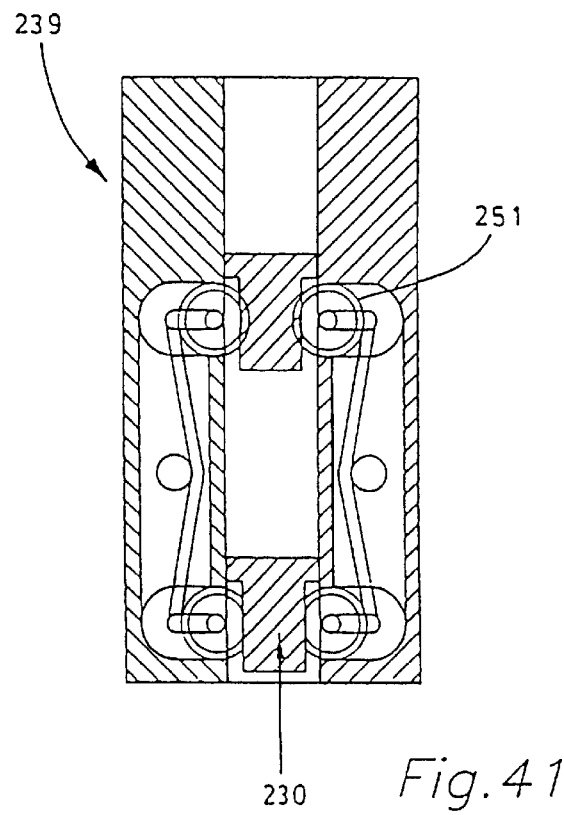

In FIG. 41, the fastener 230 is initially moved by the transfer mechanism 233 into engagement with upper rollers 251 before being engaged by the punch and guided in its travel by the lower rollers 247. The ends of the upper rollers 251 are of a radius to enable the fastener. 230 to be fed into guide bush 239 in a direction parallel to the rotational axes of the upper rollers 251.

Sensors in the fastening machine can detect the presence of fasteners at various locations in the machine and the machine can be controlled and timed by a central processor unit. The transfer mechanism may expel the fasteners 230 from the carrier tape 227 and the fasteners 230 may be blown, or fall under gravity, through a feed tube, for example, with a T-section or circular bore, to the guide bush 239. This enables the transfer mechanism 233, and tape 227, to be some distance from the fastening machine.

It will be readily apparent to the skilled addressee that the carrier tapes, and the associated feeder heads and transfer mechanisms enable accurate delivery of the fasteners to the desired location in alignment with the punch and die combination, while enabling fastening heads to be provided which can be used in extremely confined spaces.

The advantages of the invention include:

(a) the ability to feed fasteners with large diameter heads and short stems without tumbling;

(b) the carrier tape does not interfere with the movement of the fastening head;

(c) the tape is fed through a fixed guide path and does not require recoiling with each fastener cycle;

(d) there is no possibility to put more than one fastener into the fastening guide passage at one time;

(e) can give better access to the front face of the nose piece—very narrow, for example, 10 mm for 5 mm fasteners;

(f) fastener sensing is easier being positioned directly above the fastener head;

(g) fastener indexing may be remote and can occur at any time during the fastening cycle;

(h) fasteners being indexed into the feeder have a positive stop;

(i) there is no problem of tape being "chewed" out by fastener or punch and jamming the operation;

(j) the design will allow two or more fasteners to be fed simultaneously, at close centers;

(k) narrower tape is possible;

(l) the tape can be fed from any direction with regard to the product; and (m) the nose, with injection moulded rollers and springs, can be made as a totally expendable item, possibly in two pieces.

Various changes and modifications may be made to the embodiments described and illustrated without departing from the scope of the present invention defined in the appended claims.

We claim:

1. A feeder head for use with a fastening machine for feeding and driving fasteners into sheets to be fastened, said feeder head comprising:

a tape guide path defined through the feeder head for receipt of a carrier tape that carries the fasteners;

a punch configured to drive the fasteners into the sheets to be fastened;

a sprocket wheel drive configured to move the carrier tape through the tape guide path when the sprocket wheel drive is actuated and to hold the carrier tape against movement otherwise;

a retractable spring-loaded stem stop roller positioned in the tape guide path and having a surface engageable by a stem of the fasteners, the surface being configured to properly position one of the fasteners in alignment with the punch; and a spring-loaded finger mounted in the feeder head, the spring-loaded finger having a sensing element that is triggered when the one of the fasteners is aligned with the punch, the sensing element being operatively connected to the sprocket wheel drive so as to deactivate the sprocket wheel drive when the sensing element is triggered.

2. A feeder head as claimed in claim 1, wherein spring-loaded finger further activates the punch when the sensing element is triggered.

3. A feeder head as claimed in claim 1, wherein the sensing element is a limit switch activated by the spring-loaded finger.

4. A feeder head as claimed in claim 1, wherein the sensing element is a proximity sensor activated by the spring-loaded finger.

5. A feeder head as claimed in claim 1, wherein the sensing element is a light switch activated by the spring-loaded finger.

6. A feeder head as claimed in claim 1, further comprising:

an inlet tape guide passage configured to guide the carrier tape from a source to the tape guide path; and an outlet tape guide passage configured to guide empty carrier tape from the tape guide path, wherein the inlet and outlet tape guide passages are aligned in a direction of travel of the carrier tape.

7. A feeder head as claimed in claim 1, wherein the sprocket wheel drive is further configured to selectively advance the carrier tape.

8. A feeder head as claimed in claim 1, further comprising a panel and pin combination configured to advance of the carrier tape and to prevent the carrier tape from retraction as the punch is advanced toward the die.

9. A feeder head as claimed in claims 1, further comprising:

transfer mechanism including a finger configured to engage head and stems of the fasteners below the carrier tape; and a reciprocating plunger configured to move said finger so as to push the fasteners free from the carrier tape.

* * * * *